(No Model.) 5 Sheets—Sheet 1.

G. G. GREENOUGH.
APPARATUS FOR INDICATING DISTANCE AND DIRECTION OF REMOTE OBJECTS.

No. 568,755. Patented Oct. 6, 1896.

Witnesses
Jas. J. Maloney.
M. E. Hill.

Inventor,
George G. Greenough,
by Jno. P. Livermore
Atty.

(No Model.)

G. G. GREENOUGH.

APPARATUS FOR INDICATING DISTANCE AND DIRECTION OF REMOTE OBJECTS.

No. 568,755.

Patented Oct. 6, 1896.

Witnesses
Jas. J. Maloney
M. E. Hill

Inventor
George G. Greenough
by Jno. P. Linmore
Atty.

(No Model.) 5 Sheets—Sheet 3.

G. G. GREENOUGH.
APPARATUS FOR INDICATING DISTANCE AND DIRECTION OF REMOTE OBJECTS.

No. 568,755. Patented Oct. 6, 1896.

Witnesses
Jas. J. Maloney
M. D. Hill

Inventor
George G. Greenough
by Jo. P. Livermore
Atty.

(No Model.) 5 Sheets—Sheet 4.

G. G. GREENOUGH.
APPARATUS FOR INDICATING DISTANCE AND DIRECTION OF REMOTE OBJECTS.

No. 568,755. Patented Oct. 6, 1896.

Witnesses
Jas. J. Maloney
M. E. Hill

Inventor
George G. Greenough
by Jos. P. Livermore
Atty.

(No Model.) 5 Sheets—Sheet 5.

G. G. GREENOUGH.
APPARATUS FOR INDICATING DISTANCE AND DIRECTION OF REMOTE OBJECTS.

No. 568,755. Patented Oct. 6, 1896.

Witnesses
Jas. J. Maloney
M. E. Gee

Inventor
George G. Greenough,
by Jo. P. Livermore
Atty.

UNITED STATES PATENT OFFICE.

GEORGE GORDON GREENOUGH, OF FORT McPHERSON, GEORGIA.

APPARATUS FOR INDICATING DISTANCE AND DIRECTION OF REMOTE OBJECTS.

SPECIFICATION forming part of Letters Patent No. 568,755, dated October 6, 1896.

Application filed December 3, 1890. Serial No. 373,473. (No model.)

*To all whom it may concern:*

Be it known that I, GEORGE GORDON GREENOUGH, of Fort McPherson, Fulton county, Georgia, have invented an Improvement in Apparatus for Indicating the Distance and Direction of a Remote Object, of which the following description, in connection with the accompanying drawings, is a specification, like letters and numerals on the drawings representing like parts.

My invention relates to an apparatus for automatically indicating at any desired point the distance and direction of an object remote from said point, said apparatus being adapted among other things for indicating the distance and position of a vessel or other distant object for the purpose of enabling artillerymen to properly aim a gun at said object.

The determination of the distance and position of the distant object depends upon observations made from two points or stations at the ends of a base-line, the position of which has been previously accurately determined, so that when the angular position of the distant object with relation to the base-line at each end thereof is known the position of said object may be determined with relation to the said base-line and consequently with relation to any point or station, the position of which relative to said base-line is already known. Such observations are now commonly made for the purpose of determining the position of a distant object, but they require that the knowledge of the angle at both stations should be made known to a single observer or computer and involve a further mathematical computation or graphical plotting before the exact position of the distant object is determined.

The present invention consists in an apparatus operatively connected with the two observation-stations and comprising pointers or direction-indicators corresponding one to each observation-station, and so connected therewith as to move in unison with the observation or sighting instrument, so that the said line-indicator is always parallel with the axis of the sighting instrument or with the true line of sight from the observation-station to the object sighted. Thus the horizontal movement of the sighting instrument is, as it were, imparted or transmitted to the corresponding line-indicator, and for convenience in speaking of the relations of the sighting and indicating instruments the former will be called the "transmitting" and the latter the "receiving" instrument. Now if the two pointers at the receiving instrument corresponding to the two transmitting instruments at the end of the measured base-line are set so that their centers of movement are at the ends of a line parallel with the base-line it is obvious that the indicating-lines and the lines connecting their centers will form a triangle similar to that formed by the actual base-line and the two lines of observation from the ends thereof, or, in other words, the receiving instrument will produce a miniature triangle exactly similar to the actual triangle at the apex of which the observed object is situated. Again, if a point is determined with the same relation to the base-line of the receiving instrument that an actual station or object, for example, the gun to be aimed, is to the actual base of observation, then a line drawn from this point on the receiving instrument through the intersection of the line-indicators will be parallel with the line from the gun to the object and the distance from such point to said intersection on the receiving instrument will be in the same proportion to the actual distance of the object from the gun that the base-line of the receiving instrument is to the actual base-line.

For convenience the receiving instrument is provided with a third pointer or line-indicator having its center of movement in the same position with relation to the centers of the two that accompany the sighting instruments that the gun is to the said sighting instruments, and such indicating-pointer is provided with a scale that is proportioned to the actual distance, so that by turning this third pointer until it crosses the intersection of the two other pointers it will indicate the exact direction of the object from the gun, while the distance from its axis to the point of intersection will show by the scale the actual distance of the object.

The invention consists mainly in the combination of the observing and transmitting instruments with the receiving instrument, as stated, and also in the mechanism employed for causing the movements of said transmitting instruments to produce corresponding angular movements at the receiving instrument, and in other details of construction hereinafter described.

Figure 1:
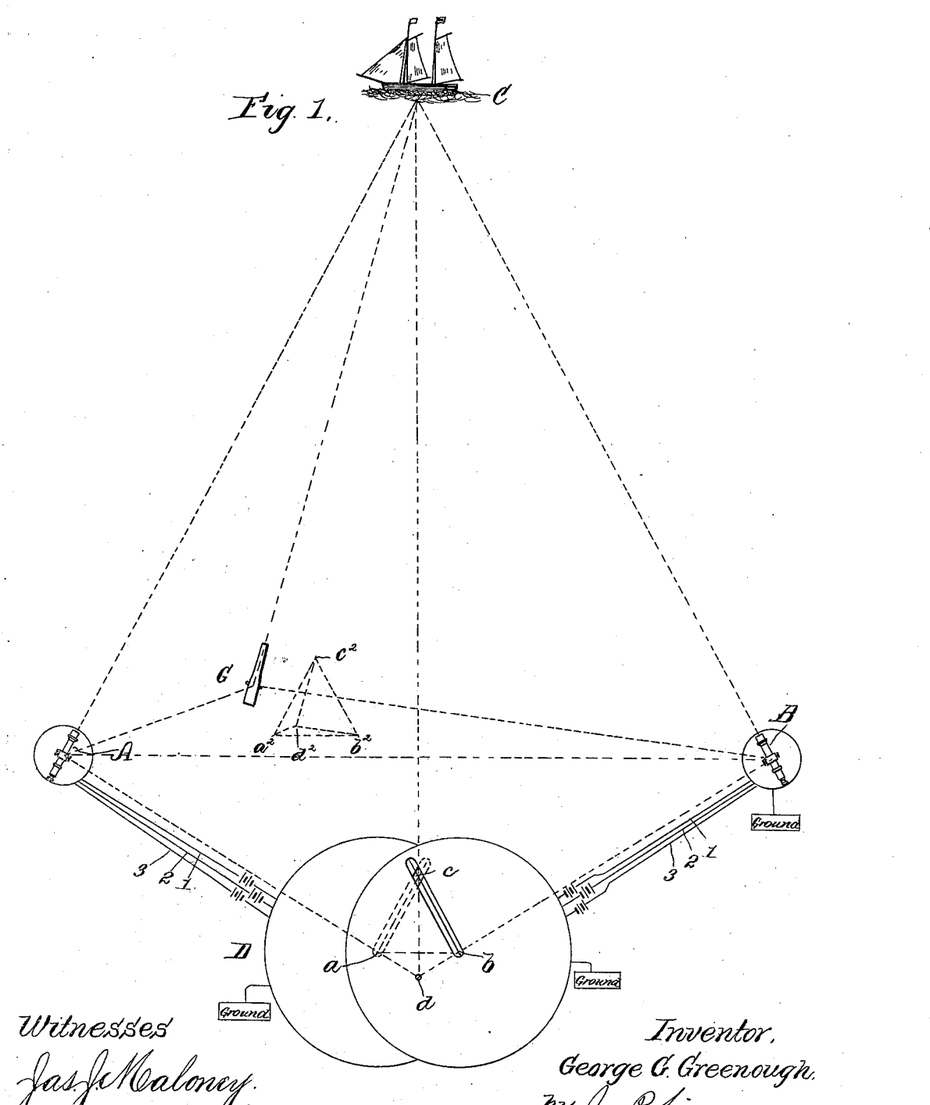
Figure 1 is a diagram illustrating the general arrangement of the observing and receiving instruments with relation to one another.

The general principle of the apparatus will be best understood from the diagram Fig. 1, in which A and B are the two observing instruments, which may be the usual telescopes such as employed in surveying, having cross-wires to determine the exact line of vision, and said telescopes turning about a vertical axis so as to be directed toward any required object.

The positions of the vertical axes, about which the telescopes A and B turn, are carefully determined, so that the imaginary line A B connecting them forms a known base, and consequently when the angle of the line of vision through each telescope to a distant object, as, for example, the vessel C, relative to said base is known sufficient data is afforded for determining the triangle A B C, and thus giving the exact position of the point C relative to the known base A B.

The receiving instrument D comprises two pointers turning about centers $a\,b$, said pointers being, in this instance, represented as lines marked upon or connected with disks turning about centers $a\,b$, and said instrument is so connected with the sighting instruments A B, by means that will be hereinafter described, that each pointer turns in exact unison with the corresponding sighting instrument, or, in other words, so that the line indicated on each always remains parallel with the vertical plane through the axis of the corresponding telescope. The centers about which the pointers turn are set so that the line joining them is parallel with the line joining the instruments A B and is in a definite known proportion to the said line, so that the line joining the points $a\,b$ forms a base for the receiving instrument D, corresponding exactly to the actual base A B, from which the observations are made, and the line indicators or pointers of the receiving instrument are at the same angle to the said base that the lines of observation are to the actual base. Consequently by observing the point of intersection $c$ of the pointers a triangle $a\,b\,c$ is indicated, which is exactly similar and proportional to the triangle A B C, the point $c$ being in the same position with relation to the points $a\,b$ that the observed object C is with relation to the observing instruments.

If now a point $d$ is determined on the receiving instrument D, having the same relation to the points $a\,b$ that the indicating instrument D itself has to the observation-stations A B, it follows that the line from $d$ to $c$ will coincide with the line from $d$ to the object C, or, in other words, the line $d\,c$ on the instrument gives the actual direction of the object C from the instrument, even if the said object C cannot be observed directly from the point D. Further, the line $d\,c$ is in the same ratio to the line $a\,b$ that the distance $d$ C is to the line A B, and consequently if a scale is used, graduated in accordance with the ratio between the lines $a\,b$ and A B, the actual distance of the object can be read off directly by applying said scale along the line $d\,c$.

Figure 4:
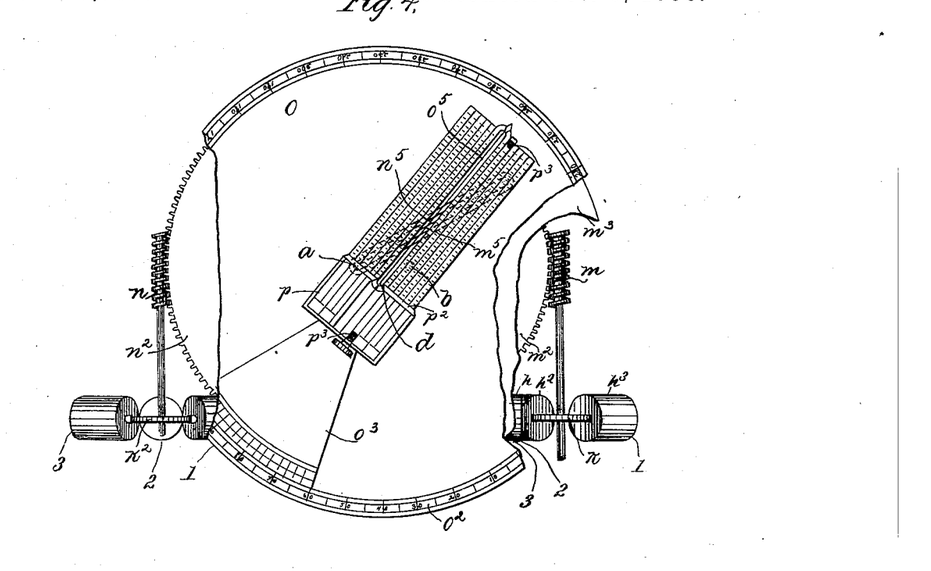
Fig. 4, a plan view of the receiving instrument with portions broken away.

The receiving instrument is provided with a third pointer or disk, Fig. 4, having its center of movement at $d$ and having a scale properly graduated to enable the distance to be read off, and by these means it will be possible to read in an instant from the instrument D the position and distance of the object C. Even if the object C is in motion the observers simply keep moving their telescopes so as to keep the axis of vision always on the moving object, and the point of intersection at $c$ will move to correspond with the movement of the actual object, so that the direction and distance can be read off at any moment, thus affording a far more efficient means for enabling a gun to be brought to bear upon a distant object than when the angles at A and B have to be read off and transmitted to a receiving-point and the position of the object computed or plotted from such readings.

Figure 2:
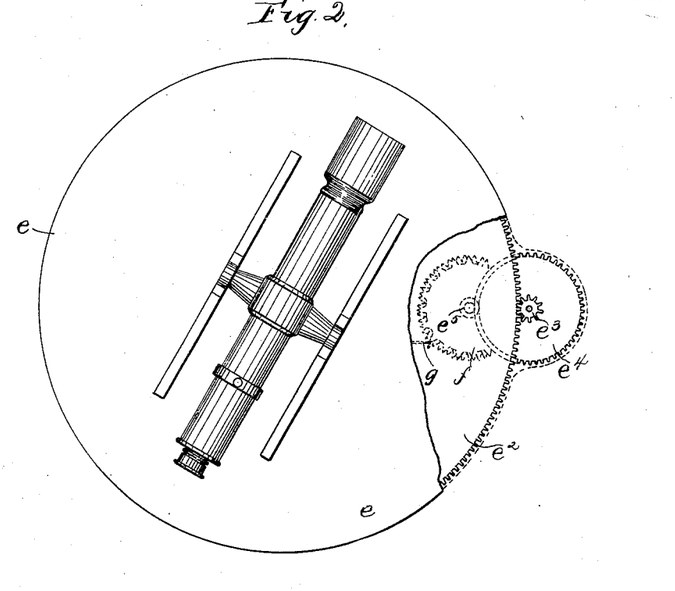
Fig. 2, a plan view of one of the observing instruments.
Figure 3:
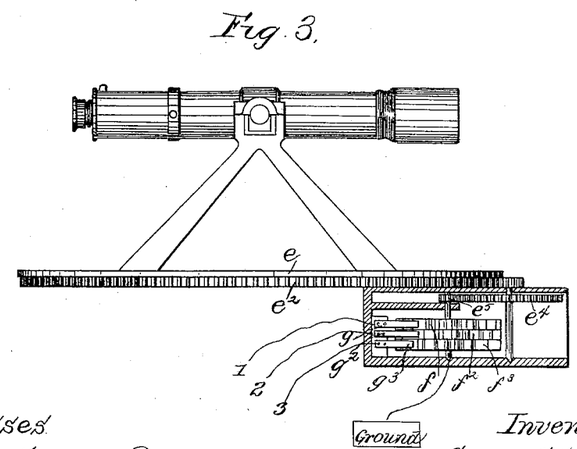
Fig. 3, a side elevation thereof.

The appliances at the observing instruments A and B that cause the pointers of the receiving instrument to accompany them are shown best in Figs. 2 and 3, in which the supporting-framework for said instruments is omitted, as this may be of any usual or suitable construction.

The telescope or other instrument for determining the visual line is supported on a base-plate $e$, which turns with the telescope about a vertical axis and is provided with gear-teeth $e^2$, meshing with a pinion $e^3$, connected with a gear $e^4$, meshing with a pinion $e^5$, carrying a set of circuit-wheels $f\,f^2\,f^3$, coöperating with contact-springs $g\,g^2\,g^3$. Thus when the telescope is turned about a vertical axis the circuit-wheels are turned with a multiplied movement, said wheels being provided with teeth or projections that make electrical contact with the contact-springs as they pass by. Each of said circuit-wheels with its corresponding spring is an independent circuit, and the teeth are so arranged that they make contact consecutively, that is, a tooth of the wheel $f$ makes contact with the spring $g$, then a tooth of the wheel $f^2$ with the spring $g^2$, and then a tooth of the wheel $f^3$ with the spring $g^3$, provided the circuit-wheels are turning in one direction, and these contacts are made in the reverse order if the circuit-wheels are turning in the opposite direction.

The gearing or connection between the telescope-platform and circuit-wheels may be of any desired construction and proportion, but is preferably so proportioned that the contact is shifted with the smallest change in angular position that would ordinarily be read by the instrument, there being a new contact made, for example, for each minute or each second of angular movement of the telescope.

Figure 7:
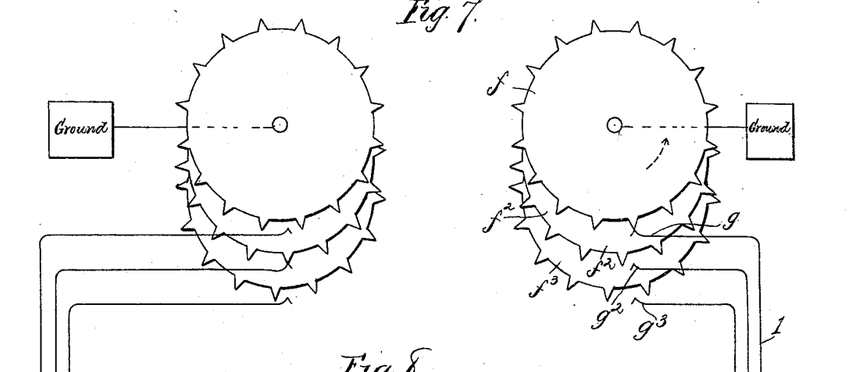
Fig. 7, a diagram showing the connection between the transmitting and receiving instrument.

The manner in which the rotation of the circuit-wheels, produced by turning the telescope, as just described, is caused to produce a proportional rotation at the receiving instrument will be best understood from the diagram Fig. 7, in which the circuit controlled by the wheel and contact $f\ g$ is marked 1, that controlled by $f^2\ g^2$ is marked 2, and that controlled by $f^3\ g^3$ marked 3. These three circuits contain electromagnetic responsive instruments, shown as solenoids $h\ h^2\ h^3$, the cores $i\ i^2\ i^3$ of which terminate in wedges opposite the periphery of a toothed wheel $k$, the teeth of which are so shaped that when one of the solenoid-cores is advanced its wedge-shaped end will move to the bottom of the notch or recess between the two teeth of the wheel that is nearest opposite to it, causing the said wheel to turn until the bottom of said notch is directly in line with the axis of the solenoid, as is indicated at the solenoid $h$, the circuit of which is represented as being closed at $f\ g$.

The axes of the solenoids are so set with relation to the teeth of the wheel that each one when advanced turns the wheel through an arc equal to a fraction of the space between two teeth from the position in which it was placed by the solenoid that last acted. For example, if there are three solenoids, as is shown in this instance, each one moves the disk through an arc equal to one-third of the space between the two teeth, and assuming, for example, that one of the solenoids has just moved the disk as is illustrated in the solenoid $h$, then the wedge of one of the remaining solenoids, as $i^2$, will be just at one side of the apex of the tooth nearest opposite it, while the wedge, as $i^3$, of the other remaining solenoid will be just at the other side of the apex of the tooth nearest opposite to it. For example, if the solenoid $h^2$ is operated next after the one $h$ its wedge $i^2$ will engage the tooth 20 in such manner as to force the said tooth away from the solenoid $h$, thus turning the wheel $k$ in the direction opposite to that of the hands of a watch, and this movement will be enough to carry the tooth 30, that is nearest opposite the wedge $i^3$ of the solenoid $h^3$, past the said wedge from the position shown in the drawings, so that when the solenoid $h^3$ follows the solenoid $h^2$ it will cause a further movement of the wheel $k$ in the same direction, and the two movements are sufficient to carry the tooth 10 past the apex of the wedge $i$, so that when the wedge $i$ follows the one $i^3$ it will engage the opposite side of the tooth 10 to that shown in the drawings as now engaged, and the result of the three movements will have been to turn the wheel $k$ one tooth in the direction opposite to the rotation of the hands of a watch. Such rotation will be continued as long as the solenoids are energized in the order $h\ h^2\ h^3$, or, in other words, as long as the circuits are closed in 1 2 3 order, which will take place as long as the circuit-wheel at the transmitting instrument continues its rotation in the direction opposite to the hands of a watch, for the teeth of the circuit-wheels $f\ f^2\ f^3$ are set in the same relation to their springs $g\ g^2\ g^3$ that the wedges $i\ i^2\ i^3$ are to the teeth of the wheel $k$. That is, it will be at once seen by reference to Fig. 7 that, starting, for example, with $f$, making contact with $g$, if the wheel, or, more strictly speaking, the set of connected wheels, is rotated in the direction opposite to that of the hands of a clock, $f^2$ will next make contact with $g^2$, and then $f^3$ with $g^3$, after which the next tooth of $f$ will again make contact with $g$, and so on. If, however, the circuit-wheel should be turned in the reverse direction, that is, the same as the hands of a watch, it will be seen that the contacts will follow in the reverse order. That is, after the contact between $f$ and $g$ contact will first be made with $f^3$ and $g^3$, then with $f^2$ and $g^2$, and then with $f$ and $g$ again, or, in other words, the circuits will be closed in 3 2 1 order. This will cause the solenoids to be energized in order $h^3\ h^2\ h$, and it will be seen than when $h^3$ follows $h$ the wedge $i^3$ will engage the tooth 30 in such manner as to turn the wheel $k$ in the direction of the hands of a watch, and that this movement will carry the apex of the tooth 20 over to the other side of the wedge $i^2$ from that shown in the drawings, so that when the solenoid $h^2$ follows the one $h^3$ the wedge $i^2$ will continue the movement of the wheel $k$ in the direction of the hands of a watch, and then the solenoid $h$ will still further continue this movement, and it is evident that the movements of the wheel $k$ both in direction and amount will correspond to the movements of the set of connected wheels $f\ f^2\ f^3$ of the transmitter.

Obviously it is not necessary that there should be three circuits and three solenoids, as it is evident that a larger number might be used, but the construction where three are employed is the simplest and is preferably taken for the purpose of illustrating this part of the invention.

It is necessary only that the solenoids should follow one another in the order corresponding to the rotation of the transmitter, and that starting with a given solenoid energized it should place the wheel in such position with relation to the solenoid that is to follow, depending on the direction of rotation of the transmitter, that the said wheel shall turn in one or the other direction, according as one or the other of the two solenoids that may succeed is called into operation.

The diagram Fig. 7 represents the circuits of two transmitters and the corresponding responsive parts of one receiving apparatus, but as the two are practically duplicates of one another the explanation of one applies equally to the other.

Figure 5:
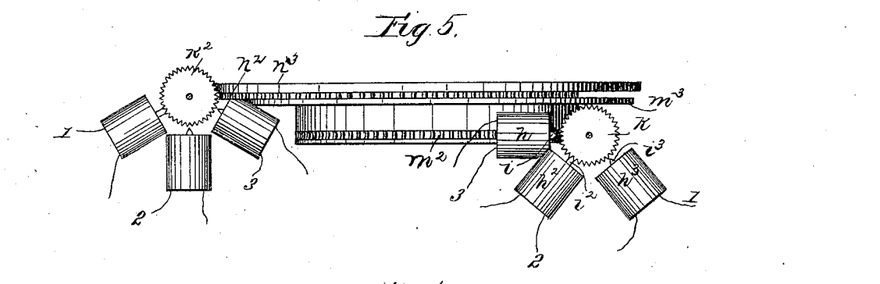
Fig. 5, a front elevation of a portion of said receiving instrument, showing the means for turning the line-indicators.
Figure 6:
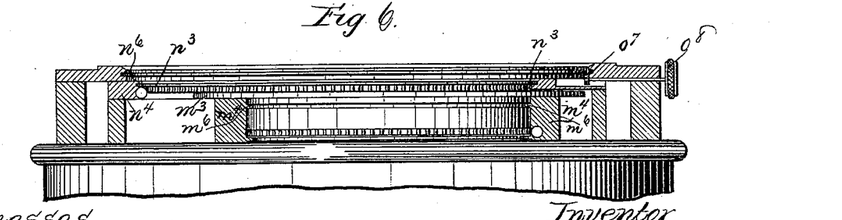
Fig. 6, a transverse section of the receiving instruments.

It being understood that the rotation of the wheel $k$ is in the same direction and proportional to that of the circuit-wheels $f\ f^2\ f^3$ of the transmitting instrument it remains to be shown how the said rotation is caused to move a pointer or line-indicator so as to keep the same parallel with the visual axis of the telescope of the transmitter. Suitable mechanism for accomplishing this result is shown in Figs. 4, 5, and 6, in which the circuit-actuating wheels $k\ k^2$ are connected to the two sighting or observing instruments A B of Fig. 1.

The shaft of the wheel $k$ is provided with a worm $m$, meshing with a worm-gear $m^2$, connected with a disk or plate $m^3$, turning in suitable bearings in a frame $m^4$, so that its center of rotation is at the point indicated at $b$, Fig. 4. The said disk $m^3$ is provided with a radial line-mark $m^5$, which may be a fiber of silk or spider-web stretched in a radial slot in the plate or any other line convenient for observation from above, and the worm-gearing $m\ m^2$ is so proportioned that the rotation of the wheel $k$, produced by and corresponding to that of the circuit-wheels of the observing instrument B, produces the same angular movement of the disk $m^3$ that takes place in the sighting instrument or telescope at B, so that if the line $m^5$ is once set parallel with the axis of the telescope it will accompany all movements of the telescope and always remain parallel with the axis of the telescope or, more strictly speaking, with the projection of the axis upon a horizontal plane. In a precisely similar manner the shaft of the wheel $k^2$ is connected by worm-gearing $n\ n^2$ with a disk $n^3$, turning in a frame $n^4$, just above the disk $m^3$, said disk $n^3$ having its center of rotation at $a$, Fig. 4, which is in the same relation to the center $b$ of the disk $m^3$ that the sighting instrument A is to the sighting instrument B. This disk has a radial line-mark $n^5$, which must in this case be so constructed as to also afford opportunity for observation of the line $m^5$ below it, and it will be understood that the intersection of the vertical planes through the lines $m^5$ and $n^5$ will stand in the same relation to the points $a\ b$ that the intersection of the actual lines of observation from the points A B stand with relation to the said points A B. The line $n^5$ is preferably a stretched fiber in a radial slot or opening through which the line $m^5$ of the disk below can be observed. The two disks $m^3$ and $n^3$ have to be so supported as to admit of free rotation of each without interference by the other, and in this instance they are shown as supported in peripheral bearings, the frame $m^4$ having an inwardly-projecting ridge $m^6$ (see Fig. 6) engaging a peripheral groove in a hub or drum on which the disk $m^3$ is supported, while the disk $n^3$ or its supporting part is provided with a peripheral projection $n^6$, engaging a corresponding groove or recess in its supporting-frame $n^4$. Thus the entire disk $m^3$ and its supporting and actuating mechanism is below the disk $n^3$, so that each turns without interference with the other. The entire framework and actuating mechanism of one disk may be made adjustable with relation to that of the other disk in the main supporting-frame, so as to set the points $a$ and $b$ in positions corresponding to the actual observing-stations in case a receiving instrument has to be used at different times in connection with different sets of observing instruments.

Figure 8:
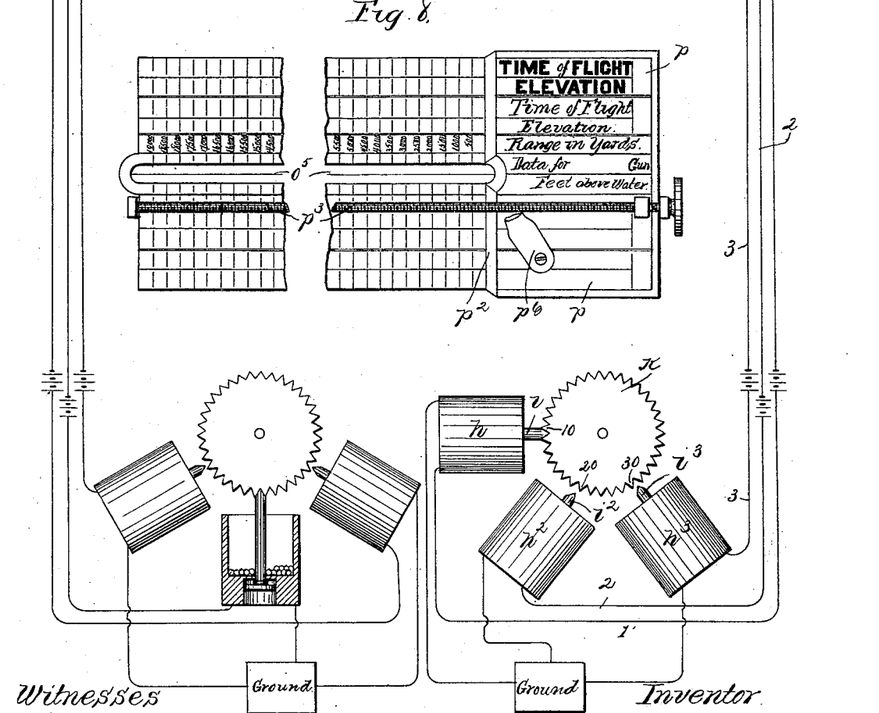
Fig. 8, a detail showing a portion of the graduated scale of the indicating-pointer enlarged.
Figure 9:
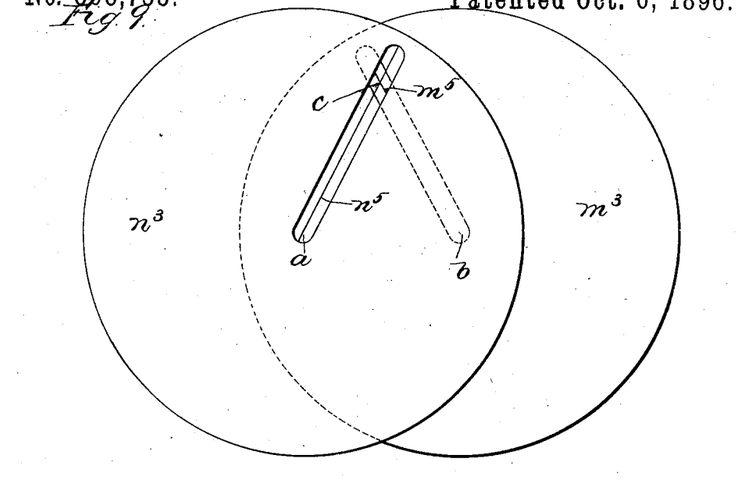
Fig. 9, a diagram view indicating the relative positions of the pointers that accompany the sighting instrument, and Fig. 10 a similar view indicating the relative positions of the sighting-pointers and of the third pointer which represents the visual line from the receiving-station through the intersection of the lines of observation.
Figure 10:
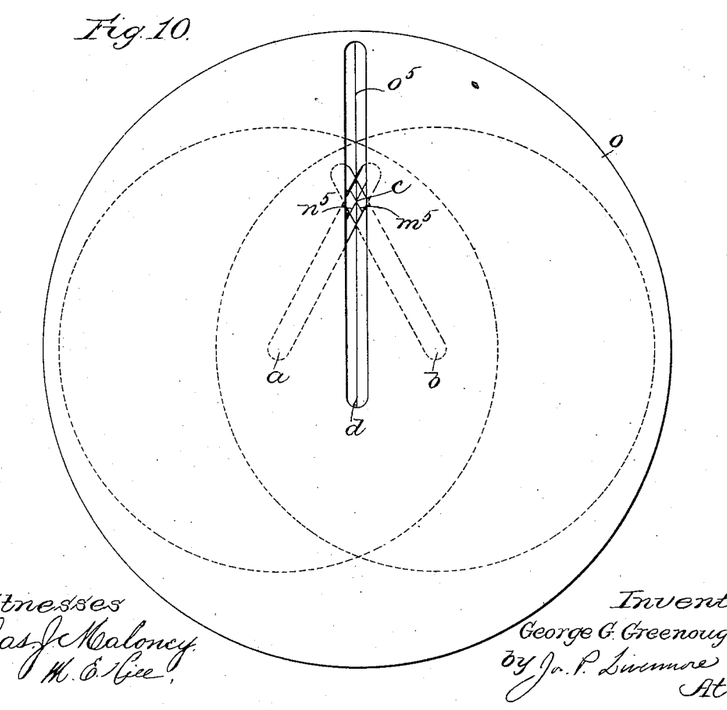

The mechanism thus far described will show by the intersection of the lines $m^5$ and $n^5$ the position of the object observed by the instruments A B, whether the same is moving or stationary, but in order to be able to read off at once on the receiving instrument the actual direction and distance of the object the said instrument is provided with a third disk $o$, the center of which is set in the same position with relation to the centers $a\ b$ that the entire instrument or that the gun to be aimed is with relation to the observation-stations A B. The said disk is provided with a radial line-indicator $o^5$, and if the disk be turned so that the said line $o^5$ is directly over the intersection of the lines $m^5$ and $n^5$ it is obvious that the said line $o^5$ will be parallel with the line from the gun to the object sighted by the instruments A B, and, furthermore, that the distance from $b$ to the intersection of $m^5$ and $n^5$ is in the same ratio to the actual distance that the distance from $a$ to $b$ is to the actual base-line of observation A B. For convenience in reading off the direction of the line $o^5$ the said disk $o$ is surrounded by a graduated limb $o^2$ and may be provided with a vernier arc $o^3$ for enabling the angular position of the disk $o$, or rather of the radial line $o^5$ thereof, to be determined and read off, and in order to indicate at once the distance of the object the line $o^5$ is provided with a scale the graduations of which are in the same proportion that the base-line $a\ b$ of the instrument is to the actual base-line of observation, or, in other words, so that the distance in yards or feet of the object may be read off at once from the scale, the graduation opposite the intersection of the lines $m^5 n^5$ indicating in yards, feet, or whatever unit is desired the actual distance of the object from the point corresponding to the point $d$ on the instrument. When used for gunnery, the said scale may have the other necessary information tabulated along with the distance, so that by observing the transverse line of the scale that is opposite the intersection of the lines $m^5 n^5$ all the necessary information may be read off from that line, namely, the actual distance, time of flight of the projectile, elevation required for the gun, &c. A portion of such a graduated scale is indicated in Fig. 8, in which the scale is provided with a sliding plate or marker $p$, the edge $p^2$ of which is brought into line with the intersection of the lines $m^5 n^5$ below. The said plate may be operated by a screw $p^3$ or other means for producing a steady movement and may be provided with a microscope or similar instrument (not shown) the axis of which may be vertically over the line of said indicator-plate, so that when said axis is brought over the intersection of the lines $m^5 n^5$ the indicator-plate $p$ will be in proper position to read off from the scale the readings along the line $p^2$. As the indicator-plate $p$ is caused to move along the line $o^5$ of the indicator-disk $o$ the latter need not have any material line on said disk, provided that there is a microscope or other similar sighting instrument the axis of which is fixed with relation to the said sliding indicator-plate $p$. A portion of a bracket or standard for supporting a microscope or similar instrument is indicated at $p^6$ of the said plate.

The above description is believed to be sufficient to thoroughly explain the nature of the invention and the essential features of construction and operation of the apparatus employed in carrying it out.

It is obvious that in details of construction the instrument should be provided with all the necessary accessories common to instruments of precision of this general character, such, for example, as tangent-screws or slow-motion devices for moving the sighting instruments or indicating-disk $o$, which is represented in Fig. 6 as moved by a pinion $o^7$, operated by a hand-wheel $o^8$ and meshing with a circular rack or gear-wheel at the under side of the disk $o$ near its periphery.

The observing-telescopes should always be turned by some comparatively slow-motion device, so as to prevent too rapid movement of the circuit-wheels.

It is obvious that there are the same requirements as to selection of a base-line and observation-stations as in ordinary triangulation, and when the position of the observed object is such that the line of observation from two given stations coincide or intersect at a very obtuse angle it will be necessary to take observations from a different base. Furthermore, it is obvious that the two observation-stations and one base-line may be employed in connection with a number of receiving instruments for guns located at different points, the actuating electrical devices of the different instruments being included in the same or different circuits from the observing instruments, as may be preferred, as the circuits 1 2 3 of Fig. 7 may each include the corresponding solenoids at several receiving instruments, the pointers of which will all move in unison with and remain parallel to the one observing instrument. Such receiving instruments may be all alike except in the position of the center $d$ of the disk $o$ relative to the centers of the disks $m^3$ and $n^3$, which position will of course be different at each instrument.

In Fig. 1 the lines of a second receiving instrument are represented at $a^2 b^2 c^2 d^2$, the point $d^2$ of which is in the same position relative to the points $a^2 b^2$ that the axis of the gun-carriage G is to the base-line A B, and the line $d^2 c^2$ indicates the direction in which the gun is to be pointed, and also will indicate by the scale the distance of the object from the gun. The mechanism for turning the indicator-lines $a^2 c^2$ and $b^2 c^2$ may be connected in the same circuits with the mechanism for operating the line-indicators of the instrument D, if desired, or may of course have independent circuits of their own.

It is obvious that various modifications may be made in the construction of the instruments and means for securing the operative connection between them without departing from the essential features of the invention.

The receiving instrument may be regarded merely as a representation of the actual triangle of observation, and it obviously is not necessary that the indicating-lines of the receiving instrument should be actually parallel with the lines of the real triangle, as will be understood, for example, by considering that the receiving instrument might be set up with its disks in a vertical instead of a horizontal plane. The readings of course would be the same and would indicate the direction and distance of the observed object, although in this case the indicated line would not actually point toward the observed object, as is represented in Fig. 1.

It may in some localities be necessary or desirable to have more than two observing-stations in order to get proper angles, and it is obvious that the receiving instrument may contain additional line-indicators corresponding to additional observing-stations. In other words, the observation-base, instead of being two points determining a line, might be three points determining a triangle, or even four or more points, if need be; but it is obvious that this is a mere extension of the apparatus herein shown and described, which has for convenience been shown in the simplest form.

The actuating appliances between the observing instrument and the receiving instrument, by which a part of the latter, namely, the pointer, is caused to move in accordance with the movements of the former, is applicable to other apparatus than a sighting instrument and a pointer, and the invention, so far as relates to this mechanism, is not limited to the precise application herein illustrated. For example, if the part now illustrated as a telescope at one of the observing-stations were a wind-vane precisely the same connections as are illustrated in Fig. 7 might be employed to move a pointer at a distance from the said wind-vane so as to indicate the exact position of the wind-vane at any moment, and other applications of the apparatus will readily suggest themselves, which may or may not require modifications in the non-essential parts of the mechanism.

I claim—

1. The combination of two or more observing instruments with a receiving instrument containing line-indicators, one corresponding to each observing instrument, and connecting mechanism between each observing instrument and the corresponding line-indicator whereby the latter is moved in unison with the former, and a third or additional line-indicator, the center of movement of which is in the same relation to that of the first-mentioned line-indicators, that a predetermined known point is to the observing instrument, substantially as described.

2. A distance and position indicating instrument comprising two or more material line-indicators movable about different centers corresponding in relative position to two or more known observing-stations, and a disk or dial, the center of movement of which is in the same relation to that of the first-mentioned indicators that a predetermined known point is to the observing-stations, said disk having means for determining a radial visual line thereon, and being provided with a graduated scale or table along said visual line, substantially as and for the purpose described.

3. The combination of a circuit-controlling wheel rotatable in either direction with a series of circuit-controlling contacts engaged successively by said wheel in definite order relative to the direction of rotation thereof, and a corresponding series of independent electromagnetic devices and electric circuits connecting the same with the respective contacts, whereby said electromagnetic devices are energized in definite order with relation to the direction of rotation of the said circuit-wheel, substantially as and for the purpose described.

4. The position-indicating instrument comprising two or more disks having peripheral bearings in which they turn about axes eccentric one to the other, substantially as and for the purpose described.

5. The combination of a circuit-controller capable of movement in opposite directions with a series of circuit-controlling contacts engaged successively thereby in definite order relative to the direction of movement of said circuit-controller, a corresponding series of electromagnetic responsive devices, and independent circuits connecting each with its respective contact, a movable toothed member actuated by said electromagnetic responsive devices the teeth being arranged with relation thereto so that the direction of movement depends upon the order of response of said devices and is thus in one or the opposite direction according as the circuit-controller is moved in one or the opposite direction, substantially as described.

6. The combination of the circuit-wheel adapted to be rotated in either direction with a series of independent contacts engaged successively thereby in one or the reverse order according to the direction of rotation thereof; a corresponding series of electromagnetic responsive devices, one connected in circuit with each of said contacts, and a toothed wheel as $k$ the teeth of which are adapted to be actuated by said electromagnetic devices and are so arranged that the direction of rotation of said wheel is in one or the opposite direction according as said devices are actuated in one or the opposite order, substantially as described.

In testimony whereof I have signed my name to this specification in the presence of two subscribing witnesses.

GEORGE GORDON GREENOUGH.

Witnesses:
J. V. F. WILSON,
J. H. JONES.